United States Patent [19]

Fakirov et al.

[11] Patent Number: 4,574,108

[45] Date of Patent: Mar. 4, 1986

[54] FIBER REINFORCED COMPOSITE

[75] Inventors: Stoyko C. Fakirov, Sofia, Bulgaria; Jerold M. Schultz, Newark, Del.

[73] Assignee: University of Delaware, Newark, Del.

[21] Appl. No.: 729,893

[22] Filed: May 2, 1985

Related U.S. Application Data

[63] Continuation of Ser. No. 553,107, Nov. 18, 1983, abandoned.

[51] Int. Cl.$^4$ .......................... B32B 9/00; D02G 3/00
[52] U.S. Cl. .................................... 428/292; 52/659; 428/221; 428/288; 428/366; 428/367; 428/379; 428/399; 523/222; 524/80; 524/439; 524/492; 524/495; 525/935
[58] Field of Search ................. 523/222; 524/80, 439, 524/440, 441, 492, 495; 525/935; 428/399, 397, 364, 367, 366, 372, 221, 288, 292, 379; 52/659

[56] References Cited

U.S. PATENT DOCUMENTS

| | | | |
|---|---|---|---|
| 3,098,723 | 7/1963 | Micks | 29/183.5 |
| 3,185,613 | 5/1965 | Adams | 428/399 |
| 3,567,569 | 8/1966 | Terumichi et al. | 428/397 |
| 3,592,272 | 7/1971 | Weaver et al. | 428/399 |
| 3,592,727 | 7/1971 | Weaver et al. | 428/399 |
| 3,876,389 | 4/1975 | Chaudhari et al. | 29/191.2 |
| 4,036,599 | 7/1977 | Dhingra et al. | 428/608 |
| 4,059,950 | 12/1977 | Wegishi et al. | 428/397 |
| 4,233,364 | 12/1980 | Van Thiel | 428/397 |
| 4,291,096 | 9/1981 | Taylor | 428/397 |

OTHER PUBLICATIONS

"Mark's Standard Handbook for Mechanical Engineers" T. Baumeister, Editor, Eighth Edition, McGraw-Hill, N.Y., Se. 12, p. 48 (1978).

*Primary Examiner*—Lorraine T. Kendell
*Attorney, Agent, or Firm*—John A. Parkins

[57] ABSTRACT

Fibers and plastic materials reinforced with these fibers which have a diameter that varies along the fiber axis are provided. The fibers increase the strength of the material by reducing fiber pull out from the plastic matrix. The variation in diameter results in an undulating surface on the fiber which locks it into the matrix.

4 Claims, No Drawings

FIBER REINFORCED COMPOSITE

This application is a continuation of application Ser. No. 553,107, filed Nov. 18, 1983, now abandoned.

BACKGROUND

Fibers have long been used to reinforce mechanical properties of composite plastic structures, but such structures often fail in use under stress conditions much lower than are predicted from the strength of its individual components. For example, structures having a combination of a plastic matrix, with only a modest level of tensile strength, in which are embedded glass fibers, with an enormously high level of this property, in theory and preliminary testing should have a very high level of performance but in use fail unexpectedly. Recent investigations have revealed that in such failures, fractures, or irreversible deformations, the pulling out of the fibers from their sockets in the plastic matrix occurs. The result is little if any reinforcement of the structures by the fiber. High energy to pull out leads to strong, tough materials.

In current approaches for increasing pullout energy, fibers are coated with compositions which provide chemical coupling between the fiber and the matrix. For example, organo-silicon compounds are used to bond organic matrix to a silica-based glass fiber. In spite of this, failures occur; the bonds so formed are inherently weaker than other components of the structure.

Another approach in efforts to increase the energy to pull out is by increasing the contact surface between the fiber and the matrix. Fibers of complex cross sections (e.g., petaloid) have been used, but without a significant decrease in the aforementioned type of failures.

Concrete, a rigid structure with a very high compressive strength but a very low tensile strength, employs steel reinforcement rods which have surface deformations to more tightly engage the rigid concrete matrix. These deformations are typically small (approximately 5-8% of the rod diameter), widely spaced, narrow ridges which extend, circumferentially, part way around the rod. The concrete, which has a low thermal expansion (and contraction), is formed around these rods at temperatures near use temperatures, so there is little tendency for the matrix to become disengaged from the reinforcement. Reinforcement of concrete, a rigid material with behavior and use characteristics decidedly different from plastic, provides no clues as to the causes of the failures in fiber-reinforced plastic structures mentioned.

SUMMARY OF THE INVENTION

It is, therefore, an object of the present invention to provide an improved fiber-reinforced plastic structure.

It is also an object to provide an improved anchoring method for reinforcing fibers in a plastic matrix.

It is yet another object to provide a fiber-reinforced matrix with improved mechanical properties under widely varying ambient and use conditions.

These and other objects are provided by a fiber-reinforced polymer composite in which the fiber has a diameter which varies along the axis of the fiber.

One aspect of the invention defines the contour of the varying diameter of the fiber in terms of the characteristics of the reinforced matrix.

DETAILED DESCRIPTION

Failure processes in a short-fiber-reinforced plastic workpiece include fiber fracture, fiber/matrix interface debonding, matrix deformation and failure, and the pulling of debonded fibers out of their matrix sockets. Recent research has shown that the most energy-consuming process of the above list is the pullout of fibers from the matrix sockets. Thus the toughness (a measure of the energy consumed in failure) depends on the friction between the debonded fiber and the matrix. This frictional force is maximized by the present invention, which provides a reinforcing fiber with a cross section which changes along the fiber axis. The matrix which embeds this fiber will have a socket with contour corresponding to the fiber; the changing diameter of the socket will mechanically engage the alternately small and large diameter portions of fiber and lock it into the matrix.

Reinforced concrete has steel rods for reinforcement, the rods often having deformed surfaces to engage the rigid socket formed by the concrete. Concrete, formed at about its use temperature, is rigid, has a very low coefficient of thermal expansion and is not subject to the types of stresses often applied to reinforced plastics. Surface deformations on reinforcing rods, small, circumferential bumps on a generally smooth rod of bar, are slight and not comparable to the undulating contour of the present invention.

Twisted yarns are used to some extent in plastic reinforcement to enhance reinforcement by virtue of the pattern of the twist on the surface. Such twisted strands of yarn, however, are weak compared to the capability of the changing diameter of individual fibers of the present invention which themselves may be spun into yarns. Axial stresses would tend to tighten the twist, partially freeing the yarn from the matrix.

There are certain considerations of importance in the undulating contour reinforcement of the present invention not comprehended by the two foregoing applications of reinforcement.

To utilize the inherent strength of fiber reinforcement in an optimum manner, the fiber preferably should have a smoothly changing, undulating contour. It is known as a result the notch effect causing a concentration of stress in a local area at the base of a notch in structures under tension, that there should be no sudden changes in diameter which can create this stress and weaken the fiber. It should have a smooth variation in diameter of approximately 20-40% of the average diameter and a wavelength (distance from smallest diameter to largest diameter) of 2 to 5 times the diameter variation. Longer waves of lower amplitudes would not have sufficient locking effect. Such a contour would be useful in most applications employing single strands, yarns, woven roving or non-woven mat reinforcement.

The present invention can advantageously be used with reinforcing fibers of several compositions that can be produced with the desired surface contour. These include glass, synthetic organic polymer, graphite, ceramics, boron, and other metal fibers. The fibers may be employed as single strands, spun yarns, woven and unwoven rovings. They may be incorporated in laminations, hand layups and the like or used as random short fibrils in molded composites.

Glass fibers afford the greatest variety of applications for which fibers of a nominal diameter of 0.2 to 0.75 mils are used. Such fibers are typically produced by mechanical pulling or drawing filaments from molten glass. During early stages of cooling where the fibers are drawn at a high speed, diameter variations are achieved by unstable drawing such as by intermittent cooling or pulsing the drawing speed. Similar treatments are effective in obtaining cyclic variations in the diameter of synthetic fibers. Useful organic fibers include polyamides, polyester and acrylic compositions. The surface contours of metal filaments can be modulated by mechanical deformation after drawing.

We claim:

1. In a reinforced plastic matrix of improved mechanical strength, having embedded therein reinforcing fibers, an improved reinforcing fiber characterized by:

a diameter variation along its axis producing alternate lengths of large diameter and small diameter wherein the axial distance from the smallest to the largest diameter of the fiber is 2 to 5 times the diameter variation to produce a socket in the matrix corresponding to the large diameter and small diameter lengths of the fiber, the small diameter socket locking the large diameter length of the fiber in the large diameter socket; and the alternating large and small diameter lengths of the fiber forming a smoothly undulating contour free of sudden changes in diameter to minimize areas of stress concentration in the fiber under axial tension.

2. A reinforced plastic structure comprising fibers embedded in a plastic matrix in which the fibers have variations in diameter along the fibers axis, the diameter variations forming alternating lengths of large diameter and lengths of small diameter wherein the axial distance from the smallest to the largest diameter of the fiber is 2 to 5 times the diameter variation resulting in a smoothly undulating contour, free of sudden changes in diameter, a cavity in the plastic matrix conforming to the contour of the fiber, the large diameter lengths of the fiber mechanically locked in the large diameter cavity of the matrix by the small diameter lengths of the cavity to increase fiber pull-out energy.

3. The reinforced plastic matrix of claim 1 in which the variation of diameter lengths of the fiber is from 20% to 40 of the average diameter of the fiber and a wavelength of 2 to 5 times the diameter variation.

4. The reinforced plastic matrix of claim 1 in which the fiber composition is selected from the group consisting of glass, synthetic high polymers, graphite, boron, ceramics, and metals.

* * * * *